July 17, 1956 W. MARGRAVE 2,755,058
PILOT CONTROLLED FLUID PRESSURE OPERATED VALVE
Filed Feb. 28, 1952 2 Sheets-Sheet 1

INVENTOR
Wilton Margrave

BY Mason, Porter, Diller & Stewart
ATTORNEYS

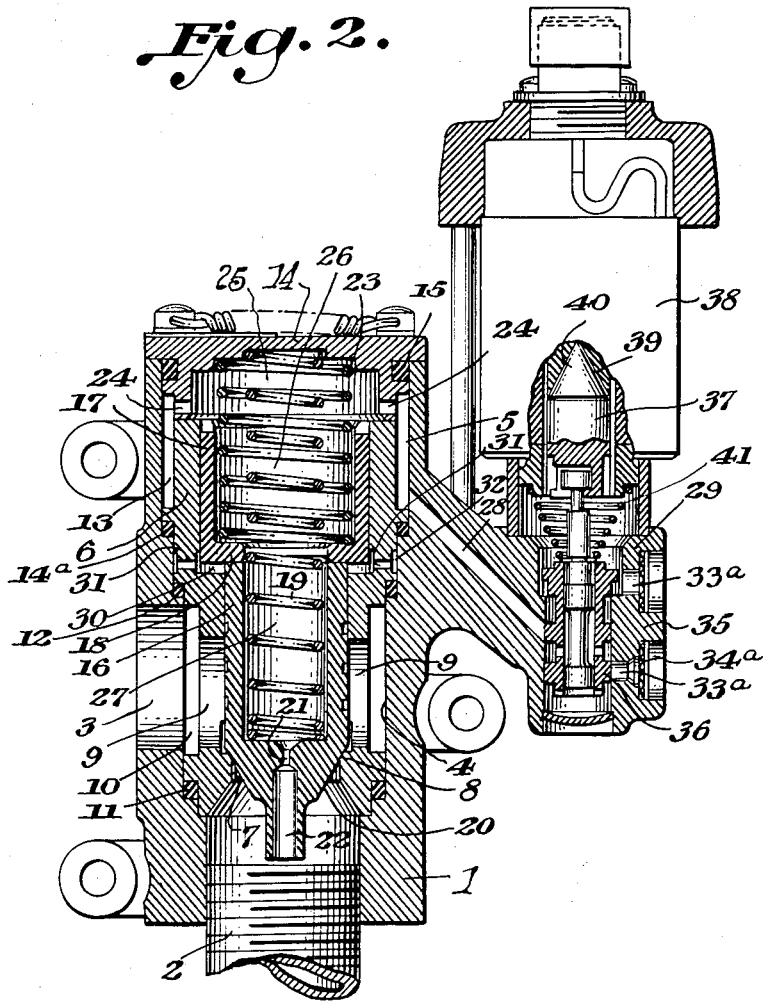

United States Patent Office 2,755,058
Patented July 17, 1956

2,755,058

PILOT CONTROLLED FLUID PRESSURE OPERATED VALVE

Wilton Margrave, Cleveland, Ohio, assignor to The Parker Appliance Company, Cleveland, Ohio, a corporation of Ohio Application February 28, 1952, Serial No. 273,983

6 Claims. (Cl. 251—43)

The invention relates to new and useful improvements in a pilot controlled fluid pressure operated valve which is particularly adapted to control the flow of a gaseous medium to its place of use.

An object of the invention is to provide a fluid pressure operated valve wherein the main valve is formed of two cylindrical sections of different diameters arranged in abutted relation and in axial alignment and operating as a unit for controlling the flow of fluid through the valve.

Another object of the invention is to provide a fluid pressure operated valve of the above type wherein the valve sections operate respectively in bores in a liner, the sections and bores being dimensioned so as to provide an accurate sliding fit which prevents leakage of a gaseous medium therebetween.

A further object of the invention is to provide a fluid pressure operated valve of the above type wherein the smaller section has the free end thereof shaped so as to provide a valve head adapted to engage a valve seat and control the flow of fluid therethrough.

A still further object of the invention is to provide a fluid pressure operated valve of the above type wherein the valve sections form one wall of a closed chamber except for a restricted passage through the valve head and a manually controlled vent opening leading to the atmosphere.

In the drawings which show by way of illustration one embodiment of the invention:

Figure 2 is a view similar to Figure 1, but showing the main valve in closed position.

Figure 1:
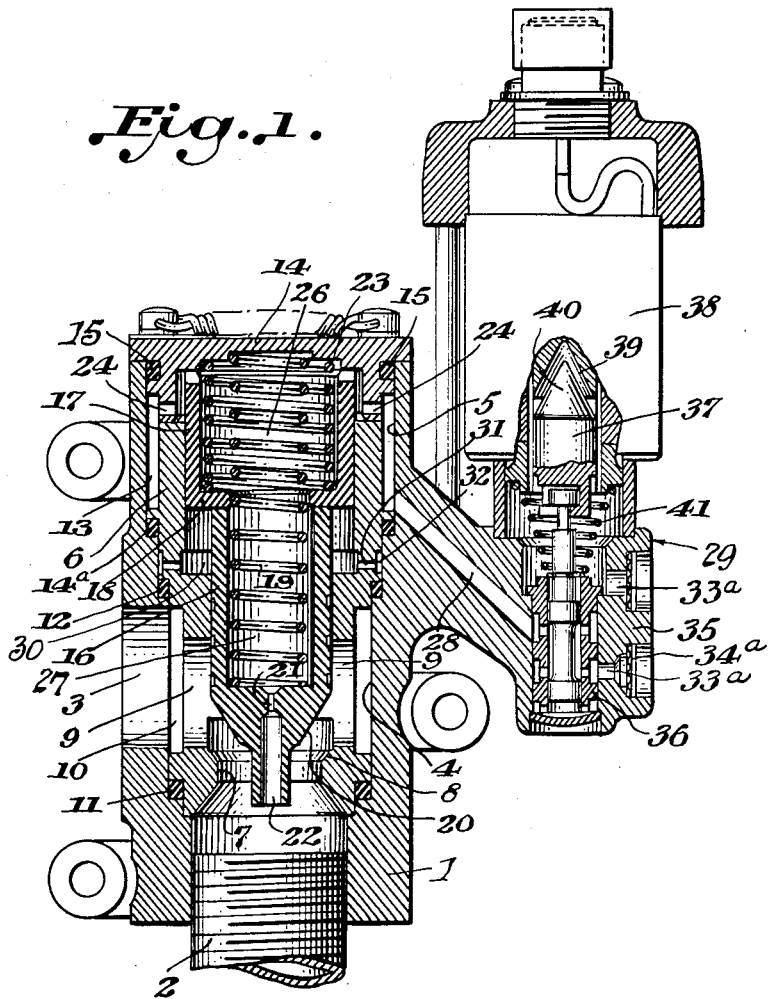
Figure 1 is a vertical sectional view through the improved fluid pressure operated valve and the pilot valve associated therewith with the main valve in open position.

The improved fluid operated valve includes a main housing or casing 1 having an inlet opening to which a pipe 2 is connected, and an outlet opening 3 to which a pipe may be attached that leads to a place of use. The casing in the lower portion thereof is provided with a cylindrical bore 4 and in the upper portion is provided with a cylindrical bore 5. Fitting in these bores of the casing is a liner 6. The liner is provided with an inlet opening 7 which is surrounded by a valve seat 8. Above the valve seat the liner has diametrically opposed openings 9 leading to an annular chamber 10 surrounding the liner. These openings 9 are in alignment with the outlet opening 3 in the housing or casing 1. Between the liner and the casing at the lower end thereof is a gasket 11. Between the liner and the casing a short distance above the outlet opening 3 is a gasket 12. There is an annular chamber 13 which surrounds the liner and a slight distance below this chamber is a gasket 14a. These three gaskets provide a fluid tight joint between the liner and the casing.

The machining of the casing and the liner where they contact each other need not be so accurately formed for the reason that these gaskets make a liquid-tight connection between the liner and the casing so as to prevent any fluid leak from the chamber 10 at the lower portion of the liner and the chamber 13 adjacent the upper portion of the liner.

There is a closure head 14 that fits within the casing and a gasket 15 serves to provide a liquid tight joint between the closure head and the casing.

The main valve is formed in two sections, the lower cylindrical section 16 and an upper cylindrical section 17. The lower cylindrical section is of less diameter than the upper cylindrical section. This upper cylindrical section is provided with an inwardly projecting flange 18 which overlies and abuts against the end of the lower cylindrical section 16. The liner at the lower portion thereof is provided with a bore in which the cylindrical portion 16 of the valve has a very accurate sliding fit. The liner also at the upper portion thereof is provided with a bore with which the upper cylindrical section of the valve makes a very accurate fit. By making the valve in two sections, the problem of keeping the two diameters concentric as well as keeping the bores concentric is largely overcome. Furthermore, by the making of the valve in two sections the machining of the valve sections and the machining of the inner surfaces of the bores with which they have sliding contact may be very accurately performed so that there will be little or no leakage between these contacting surfaces even when the valve is used for controlling the flow of hot air or other gases. This enables the valve to be used very effectively in controlling the flow of hot air to the leading edges of a jet engine to prevent ice formation.

There is a spring 19 disposed in the lower section of the valve which abuts against the closed end of the lower section. This spring also abuts at its upper end against the closure head 14. The outer face of the lower end of the valve is conical as indicated at 20 and this conical portion of the valve engages the valve seat 8. There is a restricted passage 21 through this closed lower end of the valve section 16. There is a depending cylindrical portion which has a bore 22 of larger diameter than the restricted opening. The purpose of this enlarged bore and the restricted opening will be described later. There is a spring 23 located in the upper section of the valve which bears at its lower end against the flange 18 and at its upper end the spring bears against the closure head 14. This spring 23 is of larger diameter than the spring 19 so that the spring 19 passes through the spring 23 and both springs have abutted contact with the closure head 14. The spring 19 moves the valve downward into contact with the valve seat and the spring 23 holds the upper section of the valve in contact with the lower section so that there is continuous contact between the two sections of the valve. The spring 23 also forces the valve section 16 toward the valve seat.

Figure 3:
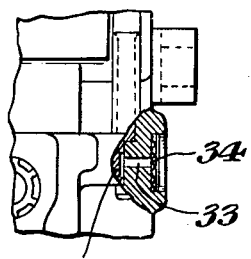
Figure 3 is a detailed view partly in section showing the vent connection with the chamber between the liner and the large section of the main valve.

The closure head has a depending portion which extends into the casing and makes contact with the upper end of the sleeve 6. There are openings 24 through the wall of the depending portion of the closure head which connect an inner chamber 25 with the annular chamber 13 disposed between the liner and the casing. This chamber 25 includes the inner chamber 26 of the upper valve section and the inner chamber 27 of the lower valve section. This chamber is closed except for the openings 24 and the restricted passage 21. The openings 24 lead to the chamber 13 and a passage or vent opening 28 leads to a pilot valve 29 which in one position connects the passage 28 with the atmosphere and in another position the passage is closed. When the valve is seated the flange 18 of the upper section will be spaced away from the shoulder in the liner as indicated at 30. This insures that the two valve sections will be in continuous contact. In order to prevent fluid pressure from building up in this chamber 30 the liner is provided with a series of passages 31 which connect with an annular chamber 32 formed between the liner 6 and the casing 1. This annular chamber 32 is connected through a vent passage 33 (Fig. 3) to the atmosphere. There is a screen 34 for closing the vent opening to keep dust and dirt from entering the same.

The pilot valve per se forms no part of the present invention. It is a desirable way of controlling the passage 28 so that it will be open to the atmosphere when it is desired to open the main valve to permit the flow of fluid through the valve and for closing the passage when it is desired to close the valve. Briefly, the pilot valve includes a housing 35 having a bore in which is located a spool valve 36 of the usual type. There are openings 33 and 33a extending through the housing 35 which lead to the atmosphere and associated with each of these openings is a screen 34a to keep dust and dirt from entering the pilot valve. Connected to the spool valve is an armature 37 of a solenoid 38 of the usual construction. This solenoid has a conical recess 39 which is adapted to receive the conical upper end 40 of the armature when the solenoid is energized. The spring 41 moves the valve downward to the limit of its downward movement and the solenoid when energized will raise the valve. When the valve is in the lower position with the solenoid deenergized then the passage 28 is opened. This connects the chamber 25, to the atmosphere so that fluid pressure in the inlet 2 will move the valve to open position as shown in Figure 1. When the solenoid is energized then the pilot valve will be raised to the position shown in Figure 2 and this will close the passage 28. The pressure of the fluid entering through the passage 21 into the chamber 25 will develop to a volume sufficient to close the valve.

The area of the valve exposed to fluid pressure at the lower end thereof is very much less than the area exposed to the fluid pressure at the upper end thereof and therefore this differential in pressure in favor of closing the valve aided by the springs will move the valve to tightly closed position. The restricted passage 21 is of lesser diameter than the passages 24 and 28 so that when the pilot valve is in open position there will be a free flow of the fluid passing through the restricted passage 21 to the atmosphere and no building up of pressure in the chamber above the valve sections. The bore 22 is slightly larger in diameter than the restricted passage 21. This provides for a bigger air stream to the restricted opening.

The improved fluid pressure operated valve as noted above is particularly adapted for controlling the flow of hot air for preventing the formation of ice or de-icing the leading edge of a jet engine. The air is taken from the jet engine compressor and is directed through the valve to the leading edge of the jet engine and preferably the air will be directed in the form of jets against the leading edge of the engine. The main valve may be positioned in any convenient place but the control switch for the solenoid of the pilot valve must be easily accessible to the operator of the plane.

It is obvious that many changes in the details of construction may be made without departing from the spirit of the invention as set forth in the appended claims.

I claim:

1. A fluid pressure operated valve comprising a casing having inlet, outlet, and venting openings, said inlet opening being disposed at the lower end portion of said casing surrounded by a valve seat, a main valve in said casing formed of two separate hollow cylindrical sections, one of smaller diameter than the other with the sections in axial alignment, the valve section of larger diameter having an inwardly projecting flange engaging the end of the smaller section, spring means disposed within the valve sections for holding the said sections in engagement and for forcing said valve toward closed position, the section of smaller diameter being shaped at the lower end thereof to provide a valve head adapted to engage the valve seat said valve head having a restricted opening therethrough, spring means disposed in said hollow sections for holding the valve sections in engagement and urging the valve toward the valve seat, said valve sections forming one wall of a closed chamber except for the restricted opening through the valve head and connections to one of the vent openings, and manually controlled means for opening and closing said vent opening, said restricted opening in the valve head being smaller than the vent opening whereby, when the vent is open, inlet fluid pressure on the valve will cause the same to open and when the vent is closed fluid pressure in the chamber will cause the valve to close.

2. A fluid pressure operated valve comprising a casing having inlet, outlet, and venting openings, a liner inclosed within said casing and having sealed engagement therewith, said liner having inlet and outlet openings connected to the inlet and outlet openings respectively in the casing, said liner inlet opening being disposed at the lower end of said liner and surrounded by a valve seat, said liner having a cylindrical bore in the lower portion thereof above the valve seat and a cylindrical bore of larger diameter in the upper portion, said bores being in axial alignment, a main valve disposed in said liner and formed of two separate cylindrical sections with the sections in axial alignment, the valve section of larger diameter having an inwardly projecting flange engaging the end of the smaller section, spring means disposed within the valve sections for holding the said sections in engagement and for forcing said valve toward closed position, said valve sections being dimensioned so as to make accurate sliding fit with said bores in the liner respectively, the section of smaller diameter being shaped at the lower end thereof to provide a valve head adapted to engage the valve seat on said liner, said valve head having a restricted opening therethrough, said valve sections forming one wall of a closed chamber except for the restricted opening through the valve head and connections to one of the vent openings, and manually controlled means for opening and closing said vent opening, said restricted opening in the valve head being smaller than the vent opening whereby, when the vent is open, inlet fluid pressure on the valve will cause the same to open and when the vent is closed fluid pressure in the chamber will cause the valve to close.

3. A fluid pressure operated valve comprising a casing having inlet, outlet, and venting openings, a liner enclosed within said casing and having sealed engagement therewith, said liner having inlet and outlet openings connected to the inlet and outlet openings respectively in the casing, said liner inlet opening being disposed at the lower end of said liner and surrounded by a valve seat, said liner having a cylindrical bore in the lower portion thereof above the valve seat and a cylindrical bore of larger diameter in the upper portion, said bores being in axial alignment, a main valve formed of two separate cylindrical sections dimensioned so as to make accurate sliding fit with said bores respectively, said upper section having an inwardly projecting flange abutting the upper end of said lower section, said lower section having a valve head shaped to engage said valve seat, said valve head having a restricted opening therethrough, and spring means engaging said valve sections for holding the upper section in abutted relation to the lower section and for normally closing the main valve, said valve sections forming one wall of a closed chamber except for the restricted opening through the valve head and connections to one of the vent openings, and manually controlled means for opening and closing said vent opening, said restricted opening in the valve head being smaller than the vent opening whereby, when the vent is open, inlet fluid pressure on the valve will cause the same to open and when the vent is closed fluid pressure in the chamber will cause the valve to close.

4. A fluid pressure operated valve comprising a casing having inlet, outlet, and venting openings, a liner enclosed within said casing and having sealed engagement therewith, said liner having inlet and outlet openings connected to the inlet and outlet openings respectively in the casing, said liner inlet opening being disposed at the lower end of the liner and surrounded by a valve seat, said liner having a cylindrical bore in the lower portion thereof above said valve seat and a cylindrical bore of larger diameter in the upper portion, said bores being in axial alignment, a main valve formed of two separate cylindrical sections dimensioned so as to make accurate sliding fit with said bores respectively, said upper section having an inwardly projected flange abutting the upper end of said lower section, the chamber between the flange and the liner being connected to one of the vent openings in said casing, said lower section having a valve head shaped to engage said valve seat, said valve head having a restricted opening therethrough and spring means engaging said valve sections for holding the upper section in abutted relation to the lower section and for normally closing the main valve, said valve sections forming one wall of a closed chamber except for the restricted opening through the valve head and connections to one of the vent openings, and manually controlled means for opening and closing said vent opening, said restricted opening in the valve head being smaller than the vent opening whereby, when the vent is open, inlet fluid pressure on the valve will cause the same to open and when the vent is closed fluid pressure in the chamber will cause the valve to close.

5. A fluid pressure operated valve comprising a casing having inlet, outlet and venting openings, a closure head for said casing, said inlet opening being surrounded by a valve seat, a main valve formed of two hollow separate cylindrical sections arranged in said casing directly above said valve seat, the lower section being of smaller diameter than the upper section and shaped at the lower end thereof to provide a valve head adapted to engage the valve seat, said valve head having a restricted flow passage therethrough centrally thereof, the upper section having an inwardly extending flange at its lower end adapted to engage the upper end of said lower section, spring means disposed within said sections for holding said sections in engagement and for forcing the valve head of the lower section into engagement with said valve seat, said valve sections forming one wall of a closed chamber above the valve except for the restricted opening and a connection to one of the vent openings in the casing, said restricted opening in the valve head being smaller than the vent opening whereby, when the vent is open, inlet fluid pressure on the valve will cause the valve to open and when the vent is closed fluid pressure in the chamber will cause the valve to close.

6. A fluid pressure operated valve comprising a casing having inlet, outlet, and venting openings, a liner enclosed within said casing and having sealed engagement therewith, said liner having inlet and outlet openings connected to the inlet and outlet openings respectively in the casing, said liner inlet opening being disposed at the lower end of said liner and surrounded by a valve seat, said liner having a cylindrical bore in the lower portion thereof above the valve seat and a cylindrical bore of larger diameter in the upper portion, said bores being in axial alignment, a main valve having upper and lower separate cylindrical sections of different diameters coaxial with each other, said cylindrical sections being dimensioned so as to make a close sliding fit with said bores respectively, the chamber beneath the lower section and between the upper end of the lower section and the liner being connected to one of the vent openings in said casing, said lower section having a valve head shaped to engage said valve seat, said valve head having a restricted opening therethrough, and spring means engaging said valve sections for normally closing the main valve, said valve sections forming one wall of a closed chamber except for the restricted opening through the valve head and connections to one of the vent openings, and manually controlled means for opening and closing said vent opening, said restricted opening in the valve head being smaller than the vent opening whereby, when the vent is open, inlet fluid pressure on the valve will cause the same to open and when the vent is closed fluid pressure in the chamber will cause the valve to close.

References Cited in the file of this patent

UNITED STATES PATENTS

| Number | Name | Date |
|---|---|---|
| 193,800 | Boyle | Aug. 7, 1877 |
| 318,899 | Haydn | May 26, 1885 |
| 695,676 | Fairchild | Mar. 18, 1902 |
| 962,551 | Conrader | Jun 28, 1910 |
| 1,074,379 | Pasman | Sept. 30, 1913 |
| 2,213,147 | Parkins | Aug. 27, 1940 |
| 2,227,629 | Cannon | Jan. 7, 1941 |
| 2,230,644 | Horta | Feb. 4, 1941 |